(12) United States Patent
Chun et al.

(10) Patent No.: US 12,512,548 B2
(45) Date of Patent: Dec. 30, 2025

(54) BATTERY PACK AND DEVICE INCLUDING THE SAME

(71) Applicant: LG ENERGY SOLUTION, LTD., Seoul (KR)

(72) Inventors: Yongho Chun, Daejeon (KR); Donghyun Kim, Daejeon (KR); Byung Do Jang, Daejeon (KR); Hyoungsuk Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 712 days.

(21) Appl. No.: 17/796,430

(22) PCT Filed: Mar. 26, 2021

(86) PCT No.: PCT/KR2021/003762
§ 371 (c)(1),
(2) Date: Jul. 29, 2022

(87) PCT Pub. No.: WO2021/210806
PCT Pub. Date: Oct. 21, 2021

(65) Prior Publication Data
US 2023/0046419 A1    Feb. 16, 2023

(30) Foreign Application Priority Data

Apr. 14, 2020    (KR) .................... 10-2020-0044967

(51) Int. Cl.
*H01M 50/262*    (2021.01)
*H01M 50/204*    (2021.01)
(Continued)

(52) U.S. Cl.
CPC ....... *H01M 50/249* (2021.01); *H01M 50/204* (2021.01); *H01M 50/262* (2021.01);
(Continued)

(58) Field of Classification Search
CPC ............ H01M 50/262; H01M 50/289; H01M 50/204; H01M 50/244
See application file for complete search history.

(56) References Cited

U.S. PATENT DOCUMENTS

2010/0247990 A1    9/2010  Ugaji et al.
2018/0316070 A1    11/2018 Lee et al.
(Continued)

FOREIGN PATENT DOCUMENTS

CN    206293584 U    6/2017
CN    108292791 A    7/2018
(Continued)

OTHER PUBLICATIONS

International Search Report for PCT/KR2021/007310 mailed Jul. 12, 2021.
(Continued)

*Primary Examiner* — Jonathan G Jelsma
(74) *Attorney, Agent, or Firm* — Birch, Stewart, Kolasch & Birch, LLP

(57) ABSTRACT

A battery pack includes a plurality of battery modules; a barrier beam disposed between neighboring battery modules among the plurality of battery modules; and a housing accommodating the plurality of battery modules and the barrier beam.

9 Claims, 4 Drawing Sheets

(51) Int. Cl.
  *H01M 50/242* (2021.01)
  *H01M 50/249* (2021.01)
  *H01M 50/271* (2021.01)
(52) U.S. Cl.
  CPC ........ *H01M 50/271* (2021.01); *H01M 50/242* (2021.01); *H01M 2200/00* (2013.01); *H01M 2220/20* (2013.01)

(56) References Cited

U.S. PATENT DOCUMENTS

| | | |
|---|---|---|
| 2019/0157642 A1 | 5/2019 | Toyota |
| 2019/0181405 A1 | 6/2019 | Kim et al. |
| 2020/0035967 A1 | 1/2020 | Yoon et al. |
| 2020/0070671 A1 | 3/2020 | Ohkuma |
| 2020/0079205 A1 | 3/2020 | Ohkuma et al. |
| 2020/0099114 A1 | 3/2020 | Ryu et al. |
| 2020/0185672 A1 | 6/2020 | Seo et al. |
| 2021/0167458 A1 | 6/2021 | Gu et al. |
| 2021/0210808 A1 | 7/2021 | Schmitz et al. |
| 2021/0273285 A1 | 9/2021 | Bluemel |
| 2021/0402884 A1 | 12/2021 | Wang et al. |
| 2022/0059901 A1 | 2/2022 | Ren et al. |
| 2024/0250359 A1 | 7/2024 | He et al. |

FOREIGN PATENT DOCUMENTS

| | | |
|---|---|---|
| CN | 109216602 A | 1/2019 |
| CN | 109686894 A | 4/2019 |
| CN | 209183605 U | 7/2019 |
| CN | 110165115 B | 12/2019 |
| CN | 110190212 B | 2/2020 |
| CN | 110828747 A | 2/2020 |
| CN | 110832664 A | 2/2020 |
| CN | 210092154 U | 2/2020 |
| CN | 210110904 U | 2/2020 |
| CN | 110190211 B | 3/2020 |
| DE | 10 2017 104 359 A1 | 9/2018 |
| EP | 3 486 101 A1 | 5/2019 |
| EP | 3905377 A1 | 11/2021 |
| JP | 2015-76216 A | 4/2015 |
| JP | 2018-538662 A | 12/2018 |
| JP | 2019-96385 A | 6/2019 |
| JP | 2020-35554 A | 3/2020 |
| JP | 2020-37376 A | 3/2020 |
| KR | 10-2017-0121555 A | 11/2017 |
| KR | 10-2018-0112618 A | 10/2018 |
| WO | WO 2010/007720 A1 | 1/2010 |
| WO | WO 2019/074193 A1 | 4/2019 |
| WO | WO 2019/224020 A1 | 11/2019 |
| WO | WO 2020/000090 A1 | 1/2020 |

OTHER PUBLICATIONS

Extended European Search Report for European Application No. 21789099.5, dated Jun. 26, 2024.

BATTERY PACK AND DEVICE INCLUDING THE SAME

TECHNICAL FIELD

Cross-Citation with Related Application(s)

This application claims the benefit of priority based on Korean Patent Application No. 10-2020-0044967 dated Apr. 14, 2020, and all contents disclosed in the document of the Korean patent application are incorporated as a part of this specification.

The present invention relates to a battery pack and a device including the same, and more particularly, to a battery pack having improved safety and a device including the same.

BACKGROUND ART

A secondary battery which may be easily applied based on a product group and have an electrical characteristic such as high energy density or the like may be generally applied to an electric vehicle or hybrid vehicle, driven by an electric drive source, as well as a portable device, a power storage device or the like. This secondary battery has been spotlighted as a new energy source for improving eco-friendliness and energy efficiency not only for its primary advantage in which the secondary battery may significantly reduce use of a fossil fuel but also for the fact that no by-product occurs from use of energy.

A secondary battery currently commercialized may include a nickel cadmium battery, a nickel hydride battery, a nickel zinc battery and a lithium secondary battery. Among these batteries, the lithium secondary battery may be in spotlight because of having little memory effect compared to the nickel-based secondary batteries, thus having its free charging and discharging, very low self-discharge rate and high energy density.

The lithium secondary battery may mainly use a lithium-based oxide and a carbon material as a positive electrode active material and a negative electrode active material, respectively. The lithium secondary battery may include an electrode assembly in which a positive electrode plate and a negative electrode plate to which the positive electrode active material and the negative electrode active material are respectively applied are disposed while having a separator interposed therebetween, and a casing sealing and housing the electrode assembly together with an electrolyte, that is, a battery case.

In general, the lithium secondary battery may be classified into a prismatic secondary battery in which the electrode assembly is embedded in a metal can, and a pouch-type secondary battery in which the electrode assembly is embedded in a pouch of an aluminum laminate sheet, based on a type of the casing.

The secondary battery used in a small device may have two or three battery cells disposed therein. However, the secondary battery used in a medium to large-sized device such as an automobile may use a battery module in which a plurality of battery cells are electrically connected to each other. Such a battery module in which the plurality of battery cells are connected in series or parallel to each other to form a battery cell stack may have improved capacity and output. In addition, the plurality of battery modules may be mounted in the device together with various control and protection systems such as a battery management system (BMS) and a cooling system to form a battery pack.

The battery pack may have a structure in which the plurality of battery modules are combined to each other, and the safety and operational efficiency of the battery pack may thus be problematic when some battery modules have overvoltage, overcurrent or overheating occurring therein. In particular, there is a trend in which the battery pack has a gradually increased capacity to improve a mileage. In a state where internal energy of the pack is also increased, it is thus necessary to design a structure to satisfy a strengthened safety standard and to secure safeties of a vehicle and a driver. To this end, there is an emerging need especially for a structure which may prevent internal thermal runaway or the like in advance or suppress transition between the modules to minimize damage even when the runaway or the like occurs.

DISCLOSURE

Technical Problem

An exemplary embodiment of the present invention provides a battery pack which may suppress transition between battery modules to minimize damage even when some modules in a battery have overvoltage, overcurrent or overheating occurring therein.

However, technical problems to be solved by an exemplary embodiment of the present invention are not limited to the aforementioned problems, and may be variously expanded in the scope of a technical idea included in the present invention.

Technical Method

According to an exemplary embodiment of the present invention, a battery pack includes: a plurality of battery modules; a barrier beam disposed between neighboring battery modules among the plurality of battery modules; and a housing accommodating the plurality of battery modules and the barrier beam.

The barrier beam may include a vertical beam extended in a first direction and a horizontal beam extended in a second direction orthogonal to the first direction.

The housing may include a bottom surface on which the plurality of battery modules are disposed, a lower housing including a side surface extended upward from an edge of the bottom surface, and at least one upper cover covering at least a portion of an upper portion of the lower housing.

The battery pack may further include at least one coupling member coupling the upper cover and the barrier beam with each other.

The upper cover may include a recession recessed toward the barrier beam at a portion where the upper cover is coupled to the barrier beam by the at least one coupling member.

The at least one coupling member may be a bolt and a nut.

The battery pack may further include a barrier frame positioned between the plurality of battery modules and the side surfaces of the lower housing and disposed along edges of the plurality of battery modules.

Each side of the barrier frame may have a shape of an empty tube.

The barrier beam may be made of steel.

According to another exemplary embodiment of the present invention, a device may include at least one battery pack described above.

Advantageous Effects

As set forth above, an exemplary embodiment of the present invention may minimize the damage by blocking the transition of the gas and flame in high temperature and high pressure to the neighboring battery modules even when some modules in the battery have the overvoltage, overcurrent or overheating occurring therein, thereby improving the safety of the battery pack.

MODE FOR INVENTION

Figure 1:
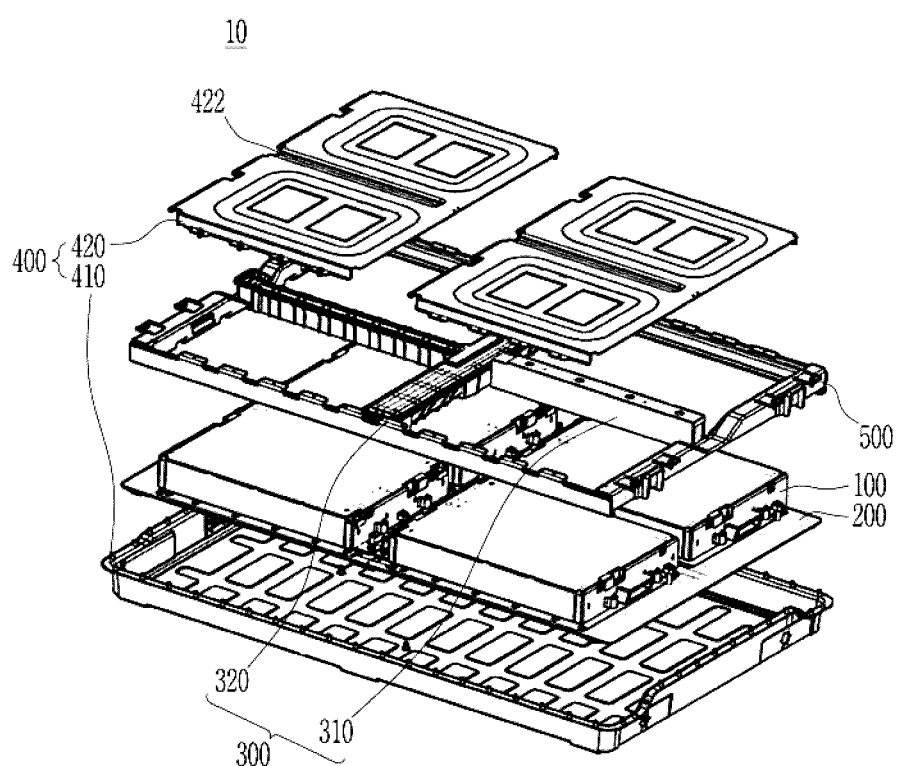
FIG. 1 is an exploded perspective view of a battery pack according to an exemplary embodiment of the present invention.

Hereinafter, exemplary embodiments of the present invention are described in detail with reference to the accompanying drawings so that those skilled in the art to which the present invention pertains may easily practice the present invention. The present invention may be implemented in various different forms and is not limited to exemplary embodiments provided herein.

A portion unrelated to the description is omitted in order to obviously describe the present invention, and the same or similar components are denoted by the same reference numeral throughout the present specification.

In addition, the size and thickness of each component shown in the accompanying drawings are arbitrarily shown for convenience of explanation, and therefore, the present invention is not necessarily limited to contents shown in the accompanying drawings. The thicknesses are exaggerated in the drawings in order to clearly represent several layers and regions. In addition, in the drawings, the thicknesses of some layers and regions are exaggerated for convenience of explanation.

In addition, when an element such as a layer, a film, a region, or a substrate is referred to as being "on" or "above" another element, it may be "directly on" another element or may have a third element interposed therebetween. On the contrary, when an element is referred to as being "directly on" another element, there is no third element interposed therebetween. In addition, when an element is referred to as being "on" or "above" a reference element, it may be positioned on or below the reference element, and it may not necessarily be "on" or "above" the reference element toward an opposite direction of gravity.

In addition, throughout the present specification, unless explicitly described to the contrary, "including" any components may be understood to imply the inclusion of other elements rather than the exclusion of any other elements.

Further, throughout the specification, the word "on the plane" may indicate a case where a target is viewed from the top, and the word "on the cross section" may indicate a case where a cross section of a target taken along a vertical direction is viewed from the side.

Hereinafter, the description describes a battery pack according to an exemplary embodiment of the present invention.

FIG. 1 is an exploded perspective view of a battery pack according to an exemplary embodiment of the present invention.

Referring to FIG. 1, a battery pack 10 according to an exemplary embodiment of the present invention may include a plurality of battery modules 100 and a barrier beam 300 disposed between neighboring battery modules among the plurality of battery modules 100. The plurality of battery modules 100 and the barrier beam 300 may be mounted on a pack tray 200 to be housed in a housing 400. The housing 400 may include a lower housing 410 accommodating the pack tray 200, and an upper cover 420 coupled to the lower housing 410 to cover an upper portion of the battery module 100.

The lower housing 410 may include a bottom surface on which the plurality of battery modules 100 and the pack tray 200 are disposed, and a side surface extended upward from an edge of the bottom surface. According to this configuration, the upper portion of the lower housing 410 may be open as shown in FIG. 1. Various control and protection systems such as the plurality of battery modules 100, the barrier beam 300, the pack tray 200 and other battery management system (BMS) and a cooling system may be mounted in the lower housing 410, and the open upper portion may be coupled to and covered by the upper cover 420.

The upper cover 420 may have a structure divided into two as shown in FIG. 1, may be integrally formed with each other as a whole, or may have a structure divided into more than two. In addition, the battery pack 10 may further include an additional case cover further covering the upper cover 420, and is not particularly limited thereto. When formed over the plurality of battery modules 100, the upper cover 420 may include a recession 422 at a portion corresponding to the barrier beam 300 disposed between the battery modules 100 as shown in FIG. 1. The upper cover 420 may come into contact with the barrier beam 300 by the recession 422, whereby a portion in which one battery module 100 is disposed may be spatially separated. As described above, the battery pack may include the upper cover 420 and include the recession 422 in the portion of the upper cover 420, corresponding to the barrier beam 300, thereby blocking transition of gas and flame in high temperature and high pressure to neighboring battery modules 100 through an upper space even when overvoltage, overcurrent or overheating (thermal issue) occurs in any one module 100 to cause the gas and flame. In addition, in normal times when such a thermal issue does not occur, the upper cover 420 disposed adjacent to an upper surface of the battery module 100 may serve as a structure suppressing vibration of the battery module 100 to improve overall stability of the battery pack 10.

The barrier beam 300 may be disposed between the neighboring battery modules 100 among the plurality of battery modules 100. The barrier beam 300 may have a pillar-shaped structure made of a material such as steel, and as shown in FIG. 1, for example, a vertical beam 310 and a horizontal beam 320 may be disposed to cross each other to form a cross shape in the battery pack 10 including four battery modules 100. This shape may be made by two beams integrally formed with each other, or by coupling the horizontal beam 320 formed short to the left and right of one vertical beam 310 to the vertical beam, and is not particularly limited thereto. In addition, when the battery modules 100 have increased number, the beams may be disposed in a lattice form which may partition all spaces between the battery modules 100.

The battery modules 100 may each be disposed in an isolated state by being blocked from each other from the neighboring modules by the barrier beam 300. Accordingly, it is possible to block transition of the gas and flame in the high temperature and high pressure to the neighboring battery modules by the barrier beam 300 even when the overvoltage, overcurrent or overheating (thermal issue) occurs in any one module 100 to cause the gas and flame, thereby preventing further occurrence of the thermal issue. In addition, in the normal times when such a thermal issue does not occur, the barrier beam 300 may serve as a structure stably supporting the battery module 100, thereby improving overall rigidity of the battery pack 10.

Meanwhile, a barrier frame 500 may be disposed along all edges of the plurality of battery modules 100. That is, the barrier frame 500 may be disposed between the plurality of battery modules 100 and the side surfaces of the lower housing 410 to surround the entire edge of the plurality of battery modules 100. The barrier frame 500 may be coupled to the upper cover 420 at an upper portion thereof. Accordingly, a space where one battery module 100 is disposed may be blocked from other portions by coupling the barrier beam 300, the barrier frame 500 and the upper cover 420 to one another to form an isolated independent space.

In addition, the barrier frame 500 may have a shape of an empty tube. In this case, a connection hole through which an internal passage of the barrier frame 500 and the battery module 100 may communicate with each other may be provided to move the gas and flame in the high temperature and high pressure, occurring in the battery module 100, having the thermal issue occurring therein, along a predetermined path, thereby emitting the gas and flame to the outside while blocking their affect on other modules.

The plurality of battery modules 100, the barrier beam 300 and the barrier frame 500 may be mounted on the pack tray 200, and fixed to the pack tray 200 by a fixing means when necessary. The battery module 100, the barrier beam 300 and the barrier frame 500 may be accommodated in the lower housing 410 while being mounted on the pack tray 200.

Hereinafter, the description describes a coupling portion between the upper cover and the barrier beam in the battery pack according to an exemplary embodiment of the present invention in more detail.

Figure 2:
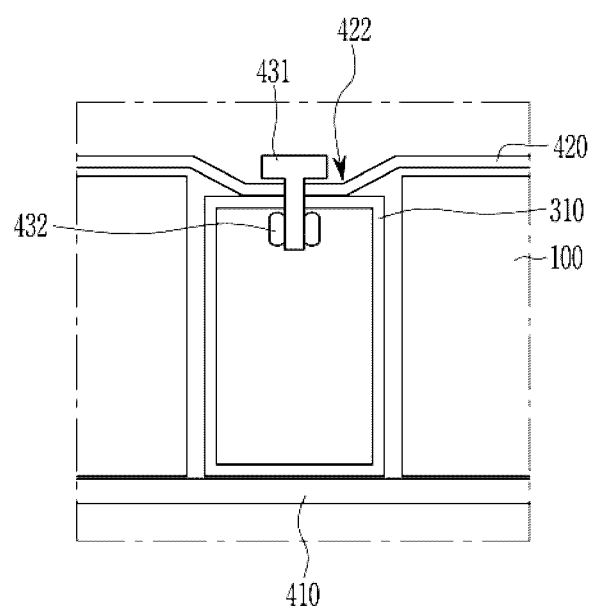
FIG. 2 is an enlarged cross-sectional view showing a coupling portion between an upper cover and a barrier beam in the battery pack according to an exemplary embodiment of the present invention.

FIG. 2 is an enlarged cross-sectional view showing the coupling portion between the upper cover and the barrier beam in the battery pack according to an exemplary embodiment of the present invention.

Referring to FIGS. 1 and 2, the recession 422 may be positioned in the portion of the upper cover 420, corresponding to the barrier beam 300, and an inner surface of the recession 422 and the barrier beam 300 may thus be in contact with each other. In a state where the recession 422 and the barrier beam 300 are in contact with each other, the upper cover 420 and the barrier beam 300 may be fixed with each other by coupling a bolt 431 and a nut 432 with each other through holes respectively formed in the upper cover 420 and the barrier beam 300. The fixing means are not particularly limited thereto, and may be coupled with each other by welding or an adhesive. As such, the upper cover 420 and the barrier beam 300 may be coupled with each other in the recession 422, and regions partitioned by the barrier beam 300 may thus be blocked and isolated from each other even in the upper portion. In addition, although not shown in the drawings, each battery module 100 may be accommodated in the blocked and isolated space by coupling the barrier frame 500 and the upper cover 420 at an overlapping portion thereof in the same manner. Accordingly, the gas and flame in the high temperature and high pressure, occurring in one battery module 100 may be blocked in all directions, thereby reliably blocking their transition to the neighboring battery module 100. In addition, the upper cover 420 and the barrier beam 300 may be fixed with each other by the fixing means, and the battery module 100 may thus be stably supported by the corresponding structure, thereby improving the stability of the battery pack 10 even in the normal times.

Hereinafter, the description describes the transition of the gas and flame in the high temperature and high pressure along with the comparative example when the issue such as the overvoltage, overcurrent or overheating occurs in some battery modules in the battery pack.

Figure 3:
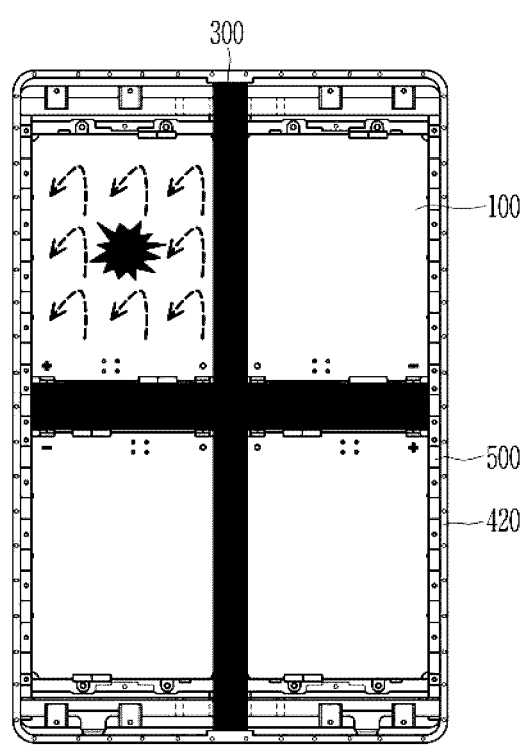
FIG. 3 is a view schematically showing a transfer path when thermal runaway occurs in some modules in the battery pack according to an exemplary embodiment of the present invention.
Figure 4:
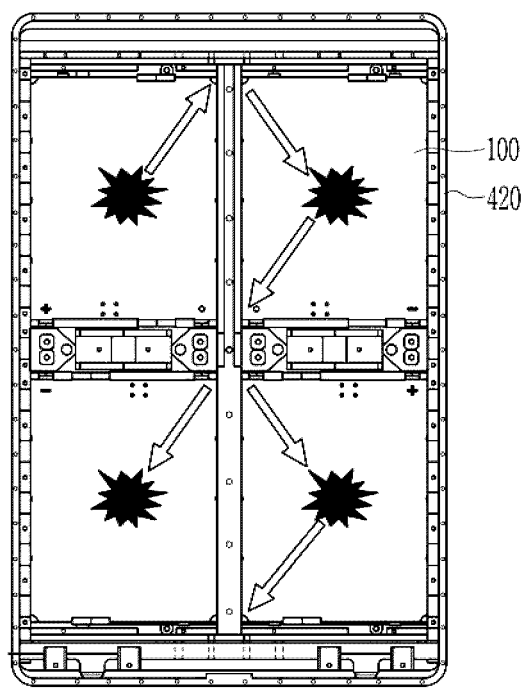
FIG. 4 is a view schematically showing a transfer path when thermal runaway occurs in some modules in a battery pack according to a comparative example.

FIG. 3 is a view schematically showing a transfer path when thermal runaway occurs in some modules in the battery pack according to an exemplary embodiment of the present invention; and FIG. 4 is a view schematically showing a transfer path when thermal runaway occurs in some modules in a battery pack according to a comparative example.

As shown in FIG. 3, according to an exemplary embodiment of the present invention including the barrier beam 300 disposed between the battery modules 100, the gas and flame in the high temperature and high pressure may not transit to the neighboring module 100, and may be blocked by the barrier beam 300 and only affect the inside of some battery modules 100 even when the gas and flame occur due to the thermal issues in some battery modules 100. It is thus possible to prevent the occurrence of additional thermal issues.

On the other hand, as shown in FIG. 4, in the conventional battery pack 10 to which such a structure of the barrier beam 300 is not applied, a venting gas (i.e. gas and flame in the high temperature and high pressure) occurring in a module 1 may randomly transit from modules 2 to 4. As a result, all modules in the battery pack 10 may be exposed to a risk of a temperature rise and a series of additional thermal runaway.

As described above, an exemplary embodiment of the present invention may include the barrier beam 300 which may serve as a structure stably supporting the battery module 100 in the normal times, and prevent the high-pressure venting gas (i.e. gas and flame in the high temperature and high pressure) from transiting to the neighboring battery modules 100 when the thermal issue occurs in the battery pack 10, thereby preventing diffusion of the gas and flame to the neighboring module. In addition, the barrier beam 300 and the upper cover 420 covering the battery module 100 may the coupled with each other, thereby providing the isolated space for each battery module 100, which may more reliably prevent the diffusion of the gas and flame to the neighboring modules. In addition, the upper cover 420 may also serve as the structure suppressing the vibration of the battery module 100, thereby further improving the stability of the battery pack 10.

The battery module described above and the battery pack including the same may be applied to various devices. Such a device may be applied to transportation means such as an electric bicycle, an electric vehicle and a hybrid vehicle. However, the present invention is not limited thereto, may be applied to various devices which may use the battery module and the battery pack including the same, and belongs to the scope of the present invention.

Although the exemplary embodiments of the present invention have been described in detail hereinabove, the scope of the present invention is not limited thereto. That is, various modifications and alterations made by a person of ordinary skill in the art by using a basic concept of the present invention as defined in the following claims fall within the scope of the present invention.

DESCRIPTION OF SYMBOLS

10: battery pack
100: battery module
200: pack tray
300: barrier beam
310: vertical beam
320: horizontal beam
400: housing
410: lower housing
420: upper cover
422: recession
500: barrier frame

The invention claimed is:

1. A battery pack comprising:
a plurality of battery modules;
a barrier beam disposed between neighboring battery modules among the plurality of battery modules; and
a housing accommodating the plurality of battery modules and the barrier beam,
wherein the housing includes a bottom surface on which the plurality of battery modules are disposed, a lower housing including a side surface extended upward from an edge of the bottom surface, and a pair of upper covers covering an upper portion of the lower housing,
wherein the barrier beam includes a vertical beam extended in a first direction and a horizontal beam extended in a second direction orthogonal to the first direction, and
wherein each of the pair of upper covers is separated from each other by the horizontal beam and includes a recession recessed toward and contacting the vertical beam.

2. The battery pack of claim 1, further comprising at least one coupling member coupling each of the upper covers and the barrier beam with each other.

3. The battery pack of claim 2, wherein each of the upper covers is coupled to the barrier beam by the at least one coupling member at the recession.

4. The battery pack of claim 2, wherein the at least one coupling member is a bolt and a nut.

5. The battery pack of claim 1, further comprising a barrier frame positioned between the plurality of battery modules and the side surfaces of the lower housing and disposed along edges of the plurality of battery modules.

6. The battery pack of claim 5, wherein each side of the barrier frame has a shape of an empty tube.

7. The battery pack of claim 1, wherein the barrier beam is made of steel.

8. The battery pack of claim 1, wherein a top surface of the vertical beam is below a top surface of the plurality of battery modules.

9. A device comprising at least one battery pack according to claim 1.

* * * * *